US008644230B2

(12) United States Patent
Henry

(10) Patent No.: US 8,644,230 B2
(45) Date of Patent: Feb. 4, 2014

(54) METHOD AND APPARATUS FOR PROVIDING COMMUNICATION OVER A WHITE SPACE CHANNEL WITHOUT CAUSING INTERFERENCE TO DIGITAL TELEVISION SYSTEMS

(75) Inventor: Paul Shala Henry, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 319 days.

(21) Appl. No.: 12/623,851

(22) Filed: Nov. 23, 2009

(65) Prior Publication Data

US 2011/0122855 A1 May 26, 2011

(51) Int. Cl.
*H04W 40/00* (2009.01)
*H04B 15/00* (2006.01)

(52) U.S. Cl.
USPC ......................................................... 370/329

(58) Field of Classification Search
None
See application file for complete search history.

(56) References Cited

U.S. PATENT DOCUMENTS

| | | | |
|---|---|---|---|
| 5,873,041 A | 2/1999 | Ishil |
| 6,088,361 A | 7/2000 | Hughes et al. |
| 6,201,499 B1 | 3/2001 | Hawkes et al. |
| 6,292,665 B1 | 9/2001 | Hildebrand et al. |
| 7,495,608 B1 | 2/2009 | Chen et al. |
| 8,416,134 B2 | 4/2013 | Henry et al. |
| 2003/0078075 A1 | 4/2003 | McNicol |
| 2003/0119525 A1 | 6/2003 | Rajkotia |
| 2004/0127226 A1 | 7/2004 | Dugad et al. |
| 2005/0030228 A1 | 2/2005 | Judd |
| 2005/0195103 A1 | 9/2005 | Davis et al. |
| 2006/0109514 A1 | 5/2006 | Klassen |
| 2008/0046978 A1 | 2/2008 | Rieger |
| 2008/0088507 A1 | 4/2008 | Smith et al. |
| 2009/0042581 A1 | 2/2009 | Liu et al. |
| 2009/0047916 A1 | 2/2009 | Haykin |
| 2009/0091494 A1 | 4/2009 | Sugimoto et al. |
| 2009/0117859 A1 | 5/2009 | Smith et al. |
| 2009/0215457 A1 | 8/2009 | Wang et al. |
| 2009/0238107 A1 | 9/2009 | Li et al. |
| 2010/0075704 A1 | 3/2010 | McHenry et al. |
| 2010/0123626 A1 | 5/2010 | Yano |
| 2010/0124254 A1 | 5/2010 | Wu et al. |
| 2010/0238898 A1 | 9/2010 | Chin et al. |

(Continued)

FOREIGN PATENT DOCUMENTS

| | | |
|---|---|---|
| GB | 2422064 | 7/2006 |
| WO | W/O 9939517 | 8/1999 |
| WO | WO 2009/045646 A2 | 4/2009 |

OTHER PUBLICATIONS

PCT Search Report and Written Opinion for PCT/US2010/053330, Jan. 18, 2011, copy consists of 11 unnumbered pages.

(Continued)

*Primary Examiner* — Jae Y Lee
*Assistant Examiner* — Alan Lindenbaum

(57) ABSTRACT

A method and an apparatus for determining an availability of at least one space channel are disclosed. For example, the method generates a first request to identify at least one available white space channel, and encodes the first request to obtain a second request, wherein the second request comprises one or more bursts of data, wherein each of said bursts of data has a duration less than or equal to a pre-determined maximum signal duration that is based on one or more error tolerance standards associated with a digital television receiver. The method then transmits the second request wirelessly to other devices to solicit a response as to the availability of at least one space channel.

16 Claims, 5 Drawing Sheets

(56) References Cited

U.S. PATENT DOCUMENTS

| | | |
|---|---|---|
| 2010/0255794 A1 | 10/2010 | Agnew |
| 2010/0271263 A1 | 10/2010 | Moshfeghi |
| 2011/0096770 A1 | 4/2011 | Henry et al. |
| 2011/0103317 A1 | 5/2011 | Ribeiro et al. |
| 2011/0116484 A1 | 5/2011 | Henry et al. |
| 2011/0149778 A1 | 6/2011 | Yu |
| 2011/0170559 A1 | 7/2011 | Zhang et al. |
| 2012/0096498 A1 | 4/2012 | Wu et al. |
| 2013/0178229 A1 | 7/2013 | Henry et al. |

OTHER PUBLICATIONS

PCT Search Report and Written Opinion for PCT/US2010/056995, Jan. 18, 2011, copy consists of 11 unnumbered pages.

PCT Search Report and Written Opinion for PCT/US2010/053339, Feb. 4, 2011, copy consists of 13 unnumbered pages.

Stevenson, C. et al., "IEEE 802.22: The first cognitive radio wireless regional area network standard", IEEE Communications Magazine, IEEE Service Center, Piscataway, US, vol. 44, No. 1., Jan. 1, 2009, pp. 130-138.

Stevenson, C, et al., "IEEE P802.22/Draftv1.0 Draft Standard for Wireless Regional Area Networks Part 22:Cognitive Wireless RAN Medium Access Control (MAC) and Physical Layer (PHY) specifications: Policies and procedures for operation in the TV Bands", IEEE, Pistcataway, NJ, USA, Jan. 1, 2006, pp. 1-426.

Yuan, Y., et al., "KNOWS: Cognitive Radio Networks Over White Spaces", New Frontiers in Dynamic Spectrum Access Networks, 2007, DYSPAN 2007, $2^{nd}$ IEEE International Symposium On, IEEE, PI, Apr. 1, 2007, pp. 416-427.

Xiaohua, L, et al., "A Frequency Hopping Spread Spectrum Transmission Scheme for Uncoordinated Cognitive Radios", Acoustics, Speech and Signal Processing, 2009, ICASSP 2009, IEEE International Conference On, IEEE, Piscataway, NJ, USA, Apr. 19, 2009, pp. 2345-2348.

Cordeiro, C, et al., "IEEE 802.22: An Introduction to the First Wireless Standard based on Cognitive Radios," Internet Citation, Apr. 2006, pp. 38-47, Retrieved from the Internet: URL: http://www.academypublisher.com/jcm/vol01/no1/jcm01013847.pdf [retreived on Jul. 8, 2008].

Do-Hyun NA, et al., "Policy-based Dynamic Channel Selection Architecture for Cognitive Radio Networks," Communications and Networking in China, 2007, CHINACOM '07, Second International Conference On, IEEE, Piscataway, NJ, USA, Aug. 22, 2007, pp. 1190-1194.

"TV-Positioning", 3 pages, Rosum Corporation, 2004.

A.J. Van Dierendonck, GPS Receivers, in Global Positioning System: Theory and Applications, vol. 1, ed. B.W. Parkinson et al. p. 337-340 1996.

Rosum, "TV-Positioning", http://wwww.rosum.com/rosum_technology_tv-positioning.html, [downloaded on Nov. 20, 2009].

Rosum, "About", http://wwww.rosum.com/rosum_about.html, [ downloaded on Nov. 20, 2009].

Rosum, "Technology", http://wwww.rosum.com/rosum_technology.html, [downloaded on Nov. 20, 2009].

METHOD AND APPARATUS FOR PROVIDING COMMUNICATION OVER A WHITE SPACE CHANNEL WITHOUT CAUSING INTERFERENCE TO DIGITAL TELEVISION SYSTEMS

The present disclosure relates generally to communication networks and, more particularly, to a method and apparatus for providing communication over a white space channel without causing interference to digital television systems.

BACKGROUND

A user may wish to use a frequency that is not licensed for broadcast television, for communication, for a wireless local area network (LAN) or for communication with other users. For example, the user may wish to use a white space channel (e.g., an unused channel in the spectrum that is allocated for television broadcasting), for communication. However, two or more devices may autonomously select the same white space channel from among a plurality of available white space channels. This will create interference between various users of such white space channels, e.g., if these users want to use the available white space channels for their own purposes such as operating a wireless LAN by each user.

Additionally, if two or more devices actually want to communicate with each other via a white space channel, another problem arises where the two or more devices actually communicate with each other before they can be certain that they have found a vacant white space channel. One approach is to implement an initial negotiation between the various devices for the purpose of identifying an available white space channel. Unfortunately, the signals transmitted for the initial negotiation for the purpose of identifying a white space channel available may cause interference with television broadcasts. For example, if a channel is not licensed at a first location of a first device, but is a licensed channel at the second location of a second device, then when the first device operating under the assumption that the channel is not licensed, uses the channel to communicate with the second device, the transmitted signal will potentially cause interference with a television broadcast at the second location of the second device.

SUMMARY

In one embodiment, the present disclosure describes a method and an apparatus for determining an availability of at least one white space channel. For example, the method generates a first request to identify at least one available white space channel, and encodes the first request to obtain a second request, wherein the second request comprises one or more bursts of data, wherein each of said bursts of data has a duration less than or equal to a pre-determined maximum signal duration that is based on one or more error tolerance standards associated with a digital television receiver. The method then transmits the second request wirelessly to other devices to solicit a response as to the availability of at least one white space channel.

In an alternate embodiment, the method receives a request wirelessly, wherein the request comprises a request for an availability of at least one white space channel, wherein the request comprises one or more bursts of data, wherein each of said bursts of data has a duration less than or equal to a pre-determined maximum signal duration that is based on one or more error tolerance standards associated with a digital television receiver. The method decodes the request to generate a decoded request, and processes the decoded request by determining the availability of at least one white space channel.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for providing communication over a white space channel without causing interference to digital televisions. Although the present disclosure is discussed below in the context of white space networks communicating with IP networks, e.g., Internet Protocol (IP) Multimedia Subsystem (IMS) networks, the present disclosure is not so limited. Namely, the present disclosure can be applied to packet networks in general.

Figure 1:
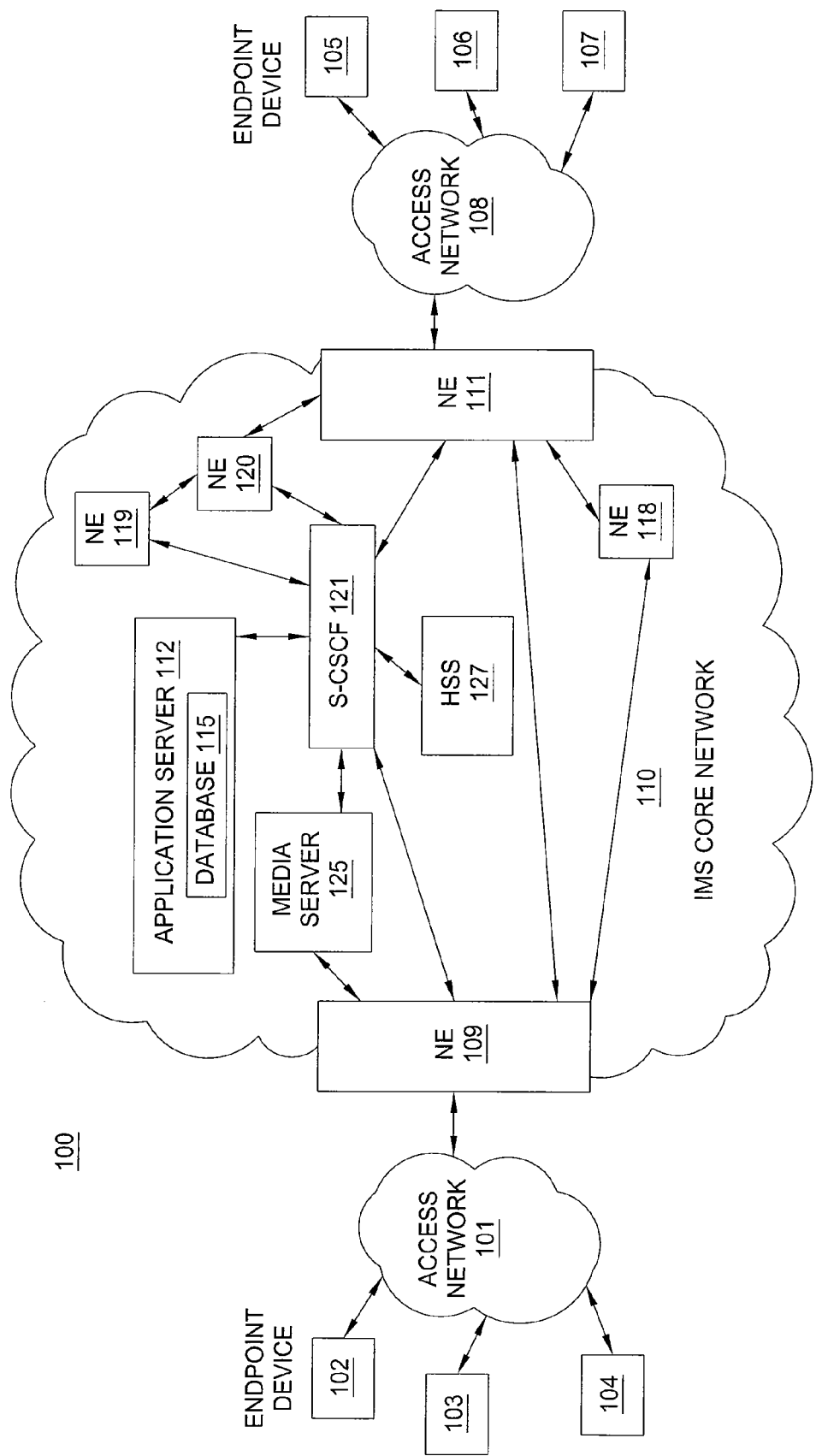
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, and the like. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a 3$^{rd}$ party network, a cellular network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. The S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is an application server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. It should be noted that the communication system 100 may be expanded by including additional endpoint devices, access networks, network elements, and application servers, without altering the scope of the present disclosure. The above IP network is only described to provide an illustrative environment in which packets for voice, data, and multimedia services are transmitted on networks.

The United States Federal Communications Commission (FCC) released unused portions of the spectrum in the frequency range of 54 MHz-698 MHz, which were previously reserved for television broadcasts, for use without a license. A channel that allows unlicensed use in this frequency range is referred to as a white space channel. A user may wish to use a white space channel for communication within a local area network of the user. For example, a user may want to use the white space channel for local use, e.g., in a local area network that interconnects a plurality of networked devices throughout the home of the user. The white space channels are attractive for communication because the transmitted signals travel long distances and are able to penetrate structures, e.g., walls in buildings and so on.

In another example, a user may want to use the white space channel to communicate with other users, e.g., friends, neighbors, coworkers, and so on. However, In order to prevent interference with licensed channels, e.g., television broadcasts, in the same spectrum, and other users who are also interested in using the available white space channels, spectrum sensing technology can be employed.

Sensing technology refers to a technology that enables a device to determine if there is transmission on a particular channel at a particular time. The spectrum sensing enables the device to identify available channels at a specific time. Once the available channels are identified, the device makes a selection of a channel from among the channels identified as being available. However, by the time the device starts transmitting on the selected channel, the channel may suddenly become unavailable. For example, each of a plurality of devices may run its own spectrum sensing method and identify a channel as being available. As a result, it is possible that the plurality of devices may actually select the same channel, thereby resulting in interference. In another example, spectrum sensing may be performed during a period of inactivity by a licensed user such a broadcasting television station temporarily off the air. That is, the channel may in fact be licensed, but appears to a device to be an unlicensed white space channel. When the activity by the licensed user resumes, interference may occur.

One approach to solving this problem is to implement an initial negotiation between the various devices for the purpose of identifying an available white space channel. Unfortunately, the signals transmitted for the initial negotiation for the purpose of identifying a white space channel that is available may cause interference with television broadcasts as discussed above.

In one embodiment, the current method enables the network service provider (or a third party) to provide customers with a method and an apparatus to initiate and establish communication over a white space channel without causing interference to digital television systems. For example, a plurality of customers of the service provider may each implement a White Space Local Area Network (WSLAN). The customers may then wish to communicate with each other over a white space channel, or to identify an available white space channel for local usage such as using the white space channel in a WSLAN. Each customer may then implement a WSLAN to communicate via a white space channel, wherein each of the WSLANs comprises at least one device with a spectrum sensing technology. For example, a WSLAN may deploy a WSLAN gateway that has the ability to determine a list of white space channels that are available (e.g., unused) at a location at a specific time. The current method enables the WSLAN gateways for the plurality of WSLANs to initiate communication over a white space channel, wherein the initiation of communication is performed without causing interference with users of television channels.

In one embodiment, the current method enables a network device, e.g., a WSLAN gateway, to initiate the communication using a burst mode transmission. The burst mode transmission encodes the data to be transmitted into a stream of one or more bursts of data of a particular duration separated by more than a pre-determined time interval, wherein an error from each of the bursts of data is tolerated by receivers in the digital televisions. For example, the data to be transmitted may have a total duration, T. In one embodiment, the encoding generates a stream of one or more bursts of data separated by a time interval $t_1$, wherein each burst has a duration $t_2$. In other words, the data of duration T is divided into multiple bursts of data wherein each burst has a duration less than or equal to t2, wherein a burst of data (with a duration t2 or less) is tolerated by digital televisions. The resulting multiple bursts of data are then transmitted such that the bursts are separated from each other by a time period greater than or equal to t1. It is important to note that if T is less than or equal to t2, then there will be only one burst of data in the stream.

In one embodiment, the current method determines the duration for a burst of data in a stream based on error correction capabilities of the digital televisions. For example, an industry guide by Advanced Television Systems Committee (ATSC) suggests that Digital Television (DTV) manufacturers design DTV receivers to tolerate an error burst or complete loss of signal of 193 microseconds. For example, a DTV may be designed with an error-correcting and/or interleaving capability to tolerate a signal loss or an error burst that does not exceed a duration of 193 microseconds. To exploit this requirement, the current method teaches generating the stream of one or more bursts of data, wherein each burst has a duration less than or equal to the maximum time duration of an error tolerated by the DTVs. For example, each of a plurality of bursts of data in a stream may have a duration less than or equal to 193 microseconds. In other words, it should be noted that each 193 microseconds burst of data that is sent (as discussed below) will be treated by the DTVs as if it was a burst of errors. Thus, data sent by white space users will be treated as errors by the DTV set.

However, errors from a plurality of bursts of data in close succession may overwhelm the above described error correction capabilities of DTVs. For example, if two or more data bursts occur in close succession, the module or algorithm that performs the error-correcting may not have adequate time to be re-set (i.e., recover from a previous burst). In other words, the data bursts that occur in close succession on a particular channel may cause a degradation of the picture quality of a signal that is transmitted on that channel. The degradation of picture quality may be visible to viewers. Hence, in one embodiment, the current method provides a time interval for separating the bursts of data. For example, a DTV receiver may be spreading out (de-interleaving) the 193 microsecond bursts of data over a pre-determined time interval, e.g., over a 7 to 8 millisecond interval. The pre-determined time interval for separating the bursts of data may then need to be set to an interval greater than 8 milliseconds, to allow the error correcting module or algorithm to recover from a previous burst of data.

It should be noted that the particular values for the duration of a burst (t2) and the time interval (t1) between each burst in a stream may be selected based on industry standards for receivers, error-correcting capabilities, etc. For example, in the future, the receivers in DTVs may comprise error correcting capabilities that tolerate interruptions of a longer duration (e.g., greater than 193 microseconds). Then, bursts of data of longer duration may be tolerated. As such, in one embodiment, the current method enables a selection and configuration of particular values for t1 and t2 by the network service provider or customer.

In one embodiment, the encoding of the data into a stream of one or more bursts of data can be performed by a gateway device, e.g., a WSLAN gateway. For example, the WSLAN gateway can receive data from a user endpoint device and encode the data into a stream of one or more bursts. In another embodiment, the encoding of the data into a stream of one or more bursts of data may occur in the same device that generated the data. For example, both generation of the data and encoding of the data may occur either in a user endpoint device or in a WSLAN gateway. It should be noted that although the present disclosure describes the encoder/decoder being embodied in the WSLAN gateway, the encoder/decoder could in fact be implemented in the user device as well. For example, the functions of the WSLAN gateway can be embodied into the user device.

Furthermore, in one embodiment each encoder/decoder in addition to being used for encoding the data into a stream of one or more bursts of data, can also be implemented such that each encoder/decoder can generate a unique signature. Thus, a device or gateway using the same encoder/decoder will recognize the unique signature, whereas another device or gateway using another encoder/decoder will recognize a different unique signature. Alternatively, in one embodiment the unique signature can be implemented into the data itself, whereas the encoder/decoder is only used to encode the data into a stream of one or more bursts of data.

The resulting stream of one or more bursts of data may then be transmitted via a wireless path to other users. In turn, DTVs that receive the bursts of data will automatically perform an error correction function to ensure that the picture quality is maintained on a channel in which the stream of one or more bursts of data is sent. Hence, the transmission of the stream of bursts of data is accomplished without causing signal degradation in the DTVs.

In one embodiment, the current method enables WSLAN gateways to cooperatively identify an available white space channel by initiating communication using a burst mode transmission. For example, a WSLAN gateway may transmit a request to identify available white space channels by first encoding the request into a stream of one or more bursts of data. The WSLAN gateways for other users may then process the request and provide responses. For example, each WSLAN gateway may provide a response as to available white space channels at its respective location. The WSLAN gateway that initiated the request may then gather all responses and determine which white space channels, if any, are available at all the desired locations. If one or more white channels are available, the WSLAN gateway may then select and use one of the available white space channels.

Figure 2:
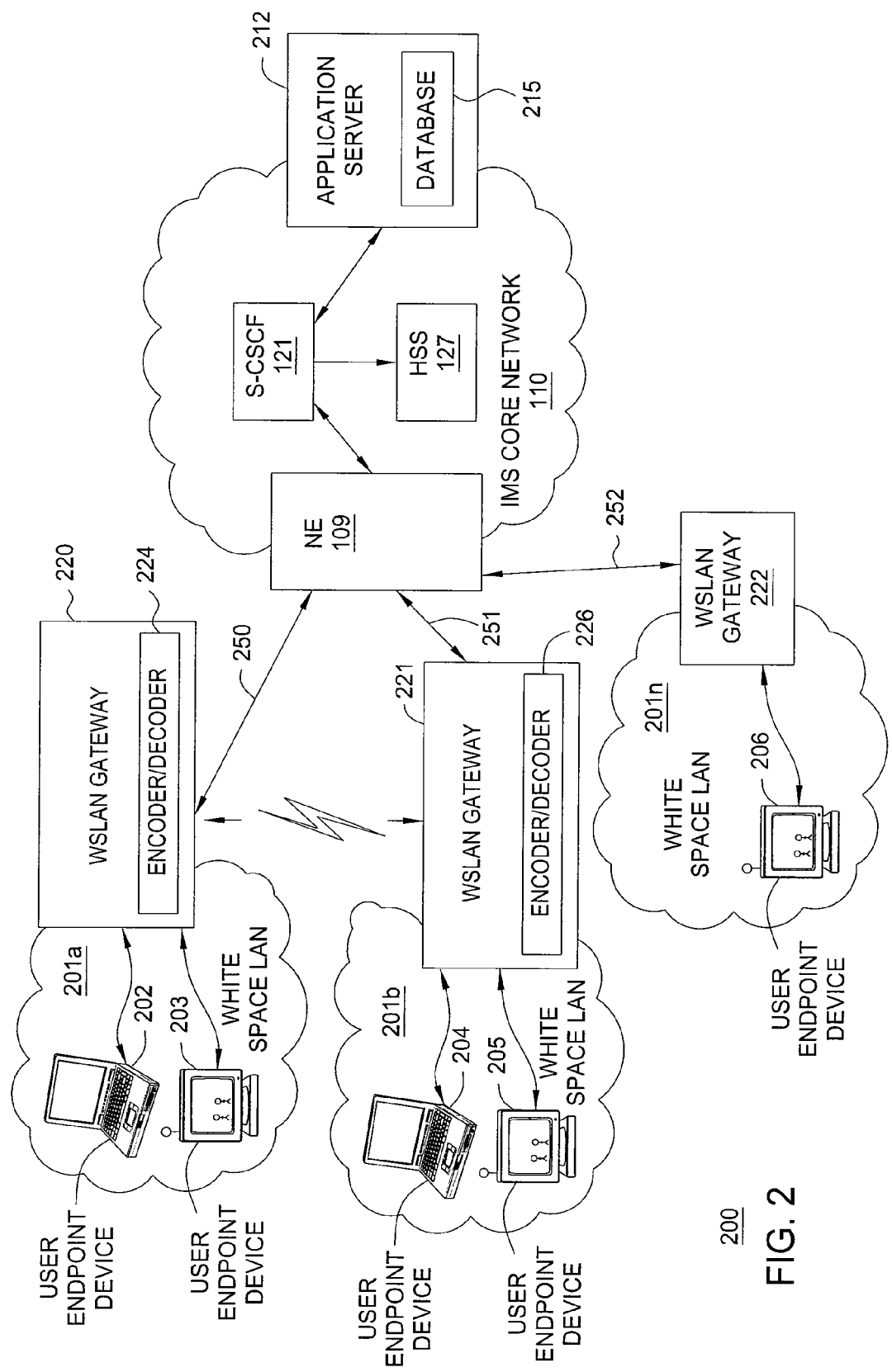
FIG. 2 illustrates an exemplary network in accordance with one embodiment of the current disclosure for providing communication over a white space channel without causing interference to digital television systems.

FIG. 2 illustrates an exemplary network 200 in accordance with one embodiment of the current disclosure for providing communication over a white space channel without causing interference to digital television systems. In one embodiment, the network 200 comprises User Endpoint (UE) devices 202-206 communicating with an IMS network 110 to access network services, through a white space LAN 201a, 201b, or 201n.

For example, the white space LAN 201a comprises UE devices 202 and 203 and WSLAN gateway 220. The UE devices 202 and 203 communicate with the IMS network 110 via the WSLAN gateway 220 and NE 109. In one embodiment, an UE or the WSLAN gateway 220 from the WSLAN 201a may transmit data towards other users wirelessly. Similarly, data transmitted wirelessly towards WSLAN 201a may be received by the WSLAN gateway 220.

Similarly, the white space LAN 201b comprises UE devices 204 and 205 and WSLAN gateway 221. The UE devices 204 and 205 communicate with the IMS network 110 via the WSLAN gateway 221 and NE 109. In one embodiment, an UE or the WSLAN gateway 221 from the WSLAN 201b may transmit data to other users wirelessly. Similarly, data transmitted wirelessly towards WSLAN 201b may be received by the WSLAN gateway 221.

The white space LAN 201n comprises an UE device 206 and a WSLAN gateway 222. The UE device 206 communicates with the IMS network 110 via the WSLAN gateway 222 and NE 109.

It should be noted that although the WSLAN gateway 220 or 221 is shown as performing the wireless transmission, the WSLAN may in fact use another network device or a separate module for modulation of the signal and transmission. For example, the WSLAN gateway may utilize a Frequency Division Multiplexer (FDM) module for performing modulation. The FDM module may then comprise a transceiver for communication with other FDM modules via a wireless path.

It should also be noted that although the WSLAN gateway is illustrated as a separate module in FIG. 2, the present disclosure is not so limited. In other words, the WSLAN gateway need not be physically distinct from the UE devices. In WSLAN 201a, for example, the WSLAN gateway 220 could be a program running on the computer 202 and so on.

For illustration, the IMS core network comprises an NE 109, an S-CSCF 121, a HSS 127, an application server 212 and a database 215. It should be noted that the IMS network 110 and the white space LANs may comprise any number of other network devices. For clarity reasons, the present disclosure only includes those components that are used to describe the various embodiments as discussed above.

It should also be noted that the WSLANs 201a, 201b and 201n may communicate with the IMS 110 via a variety of communications media and different network elements that reside at the edge of the IMS core network. For example, communication links 250, 251 and 252 may be wireless based, or wire based.

In one embodiment, a plurality of customers of a network service provider may wish to communicate with each other over a white space channel. For example, a customer with an endpoint device 202 and a customer with an endpoint device 204 may wish to communicate with each other over a white space channel. The WSLAN gateway 220 serving the user endpoint device 202 and the WSLAN gateway 221 serving the user endpoint device 204 may then need to cooperatively identify a white space channel that is available at both locations.

In one embodiment, the service provider of network 110 can assist the plurality of customers to properly select a white space channel for communication as a service, e.g., a service that can be subscribed by a customer. For example, the service provider will provide an algorithm for encoding of data into streams of one or more bursts of data to a plurality of customers, wherein the stream of bursts of data are used to identify an available white space channel. For example, a customer may communicate with an application service in the service provider's network to obtain an encoding/decoding algorithm, wherein the encoding/decoding algorithm is used to encode data into one or more bursts of data on the transmission side. In turn, the same encoding/decoding algorithm is used by another user to decode the data on the receiver side. In other words, the service provider or a third party may serve as a repository of various encoding/decoding algorithms (e.g., stored in an application server or a HSS) that can be accessed by a plurality of users. Users of a particular group (e.g., friends and family) or users at a particular location (e.g., neighbors or users within a geographical area) can be registered or identified so that they can use the same encoding/decoding algorithm. In one embodiment, an encoding/decoding algorithm (or broadly an encoder/decoder) can be downloaded from a network service provider or a third party onto a WSLAN Gateway.

Broadly, the "customer" is to be interpreted to include an owner of the WSLAN. As such, in one embodiment, it is the owner of the WSLAN gateway who would subscribe to the channel-sharing service, rather than the separate owners or users of the UE devices. Furthermore, a customer is broadly interpreted as a subscriber to at least one service, e.g., provided by a network service provider. Furthermore, the term "user" is broadly interpreted to include customers and/or "non-customers", where non-customers are not subscribers of at least one service, e.g., provided by a network service provider.

To illustrate, the WSLAN gateway 220 comprises an encoder/decoder 224, and the WSLAN gateway 221 comprises and an encoder/decoder 226. The encoder/decoders 224 and 226 are used for encoding of data to be transmitted and decoding of data that is received. Namely, the encoding of data encodes data to be transmitted to streams of one or more bursts of data. In the reverse direction, one or more bursts of data being received from other devices are decoded to recover the original data that was encoded by the other devices. For example, the decoded data may be a request that was previously encoded by another WSLAN gateway.

In order to identify which white space channels are available at all the desired locations, the WSLANs may each use a sensing technology at their respective locations. For example, a sensing technology may be implemented in the WSLAN gateways 220 and 221. The WSLAN gateways 220 and 221 may then exchange the information gathered via the sensing technology for their respective locations, by first encoding the information to a stream of one or more bursts of data, transmitting the stream of one or more bursts of data, and decoding the responses received from other devices. The WSLAN gateways 220 and 221 may then exchange information and cooperatively identify an appropriate white space channel without causing interference to any television broadcasts.

Figure 3:
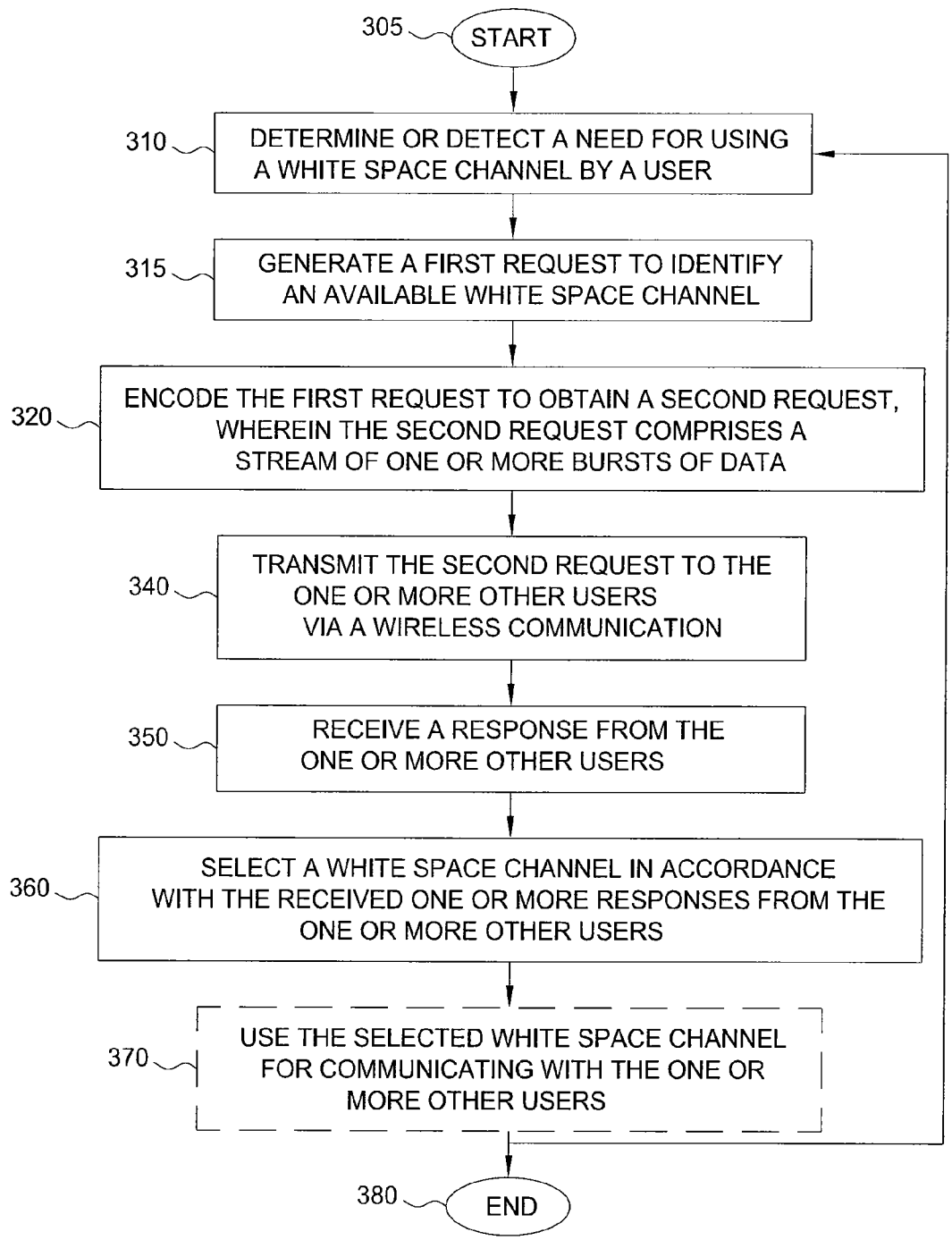
FIG. 3 illustrates a flowchart of a method for initiating communication over a white space channel without causing interference to digital television systems.

FIG. 3 illustrates a flowchart of a method 300 for initiating communication over a white space channel without causing interference to digital television systems. In one embodiment, the method can be implemented in a WSLAN device, e.g., a WSLAN gateway device or a user endpoint device. For example, method 300 can be used for initiating a negotiation between users to identify an available white space channel. Method 300 starts in step 305 and proceeds to step 310.

In step 310, method 300 determines or detects a need for using a white space channel by a user. For example, a White Space Local Area Network (WSLAN) gateway may receive a first request for a white space channel from a user endpoint device of a user. For example, the user endpoint device may send a request for a white space channel to the device serving as the WSLAN gateway device for the user. In another example, the WSLAN gateway itself needs to use a white space channel.

In step 315, method 300 generates a first request to identify an available white space channel, wherein the white space channel is for communicating by the user with one or more other users. For example, the first request may be a query to solicit one or more responses from the one or more other users regarding availability of white space channels at their respective locations.

In step 320, method 300 encodes the first request to obtain a second request, wherein the second request comprises a stream of one or more bursts of data. For example, the method may encode the first request such that the resulting second request comprises a stream of one or more bursts of data, wherein the transmission of the bursts of data will not cause interference to DTVs. In other words, the bursts of data will have characteristics that DTVs will recognize as errors that will be automatically suppressed.

In one embodiment, each of the one or more bursts of data has a duration less than or equal to a pre-determined maximum signal duration. In one embodiment, the pre-determined maximum signal duration is selected based on one or more error tolerance standards for receivers in digital televisions. In one embodiment, the pre-determined maximum duration is selected based on error-correcting capabilities of one or more digital televisions. For example, in one embodiment the pre-determined maximum signal duration can be 193 microseconds, as described above. In one embodiment, the pre-determined maximum signal duration is configured by the network service provider or customer. For example, as the algorithms for error-correction improve, the service provider may configure new values for a pre-determined maximum signal duration in WSLAN gateways or user endpoint devices.

In one embodiment, the one or more bursts of data are separated from each other by at least a pre-determined time interval. In one embodiment, the pre-determined time interval is selected based on one or more error tolerance standards error-correcting capabilities for receivers in digital televisions. For example, the pre-determined time interval may be 8 milliseconds, as described above. In one embodiment, the pre-determined time interval is configured by the network service provider or customer. For example, the error bursts at the DTV receivers may be de-interleaved over a shorter or a longer time period. The service provider may configure new values for a pre-determined time interval in WSLAN gateways or user endpoint devices, ensuring that the new value exceeds the maximum de-interleaving time in DTV receivers. For example, if the de-interleaving is as high as ten milliseconds, then the service provider will configure the value for a pre-determined time interval to be greater than ten milliseconds, e.g. 11 milliseconds and so on.

In step 340, method 300 transmits the second request to the one or more other users via a wireless communication. For example, the method may wirelessly transmit to a plurality of WSLAN gateways serving the one or more other users with whom the user wishes to initiate communication over an available white space channel.

The WSLAN gateways of the other users receive the second request. For example, the WSLAN gateways receive and decode the one or more bursts of data, to retrieve the first request using the same encoder/decoder. The one or more other WSLAN gateways may then process the request and send a response in accordance with their respective knowledge of the available white space channels. For example, each of the one or more other gateways may have spectrum sensing to identify which of the white space channels are available at their respective locations. Each of the one or more other gateways may then send a response with information regarding available white space channels.

In step 350, method 300 receives at least one response from the one or more other users. For example, a response is received from the WSLAN gateways of the one or more other users that have spectrum sensing technology. The response may contain one or more available white space channels being reported back as being available for use to communicate with the one or more other customers. The response is obtained by a decoder that receives bursts of data from other devices, e.g., WSLAN gateways, and outputs the response that was previously encoded by the responding other devices, e.g. WSLAN gateways.

In step 360, method 300 selects a white space channel in accordance with the received one or more responses from the one or more other users. For example, the method may determine that there are "n" number of white space channels that are available for use at all the desired destinations.

For example, if the user is intending to use the white space channel to communicate with ten other users and each one of the gateways serving the ten other users sends a response, the method may identify which channels are commonly available at all eleven locations, i.e., the source location and the ten destination (other user) locations. For instance, from among the "n" white space channels there may be only one white space channel that is commonly available at all of the eleven locations. The channel that is available at all of the eleven locations is then selected. The method then proceeds to optional step 370.

In optional step 370, method 300 uses the selected white space channel for communicating with the one or more other users. For the example above, the method may establish communication between the user and the other ten users over the selected white space channel, which is found to be available at all of the eleven locations. Alternatively, in one embodiment, the user may not want to use the available white space channel for communication with the other users. In fact, the user may simply want to reserve the available white space channel for private use within the user's own WSLAN. In this scenario, the initial negotiation results in an available white space channel that is reserved for use only by the requesting user. Returning back to step 370, the method then proceeds to step 380 to end processing the current request, or returns to step 310 to continue with identification of a next need for a white space channel.

Figure 4:
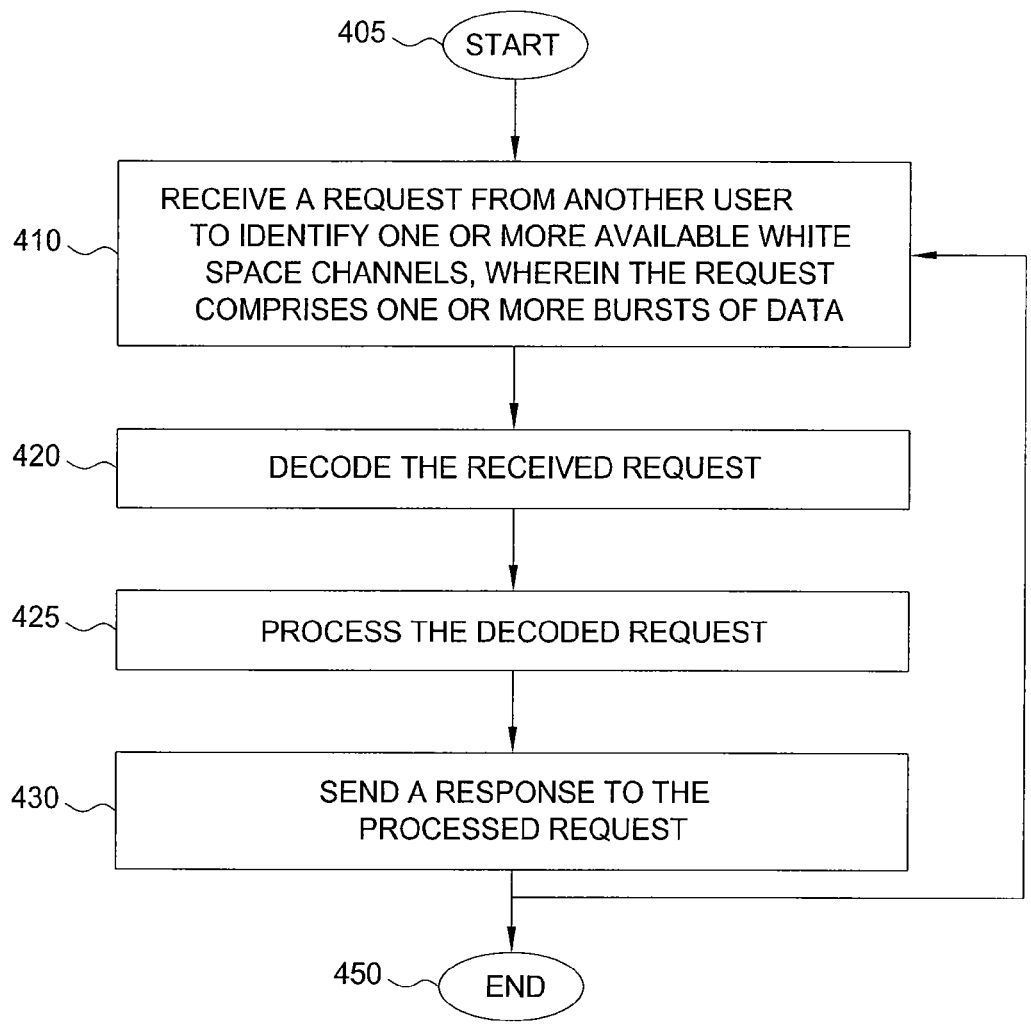
FIG. 4 illustrates a flowchart of a method for receiving an initiation of communication over a white space channel without causing interference to digital television systems.

FIG. 4 illustrates a flowchart of a method 400 for receiving an initiation of communication over a white space channel without causing interference. In one embodiment, the method 400 can be implemented in a network device serving as a gateway for a WSLAN. Method 400 starts in step 405 and proceeds to step 410.

In step 410, method 400 receives a request from another user to identify one or more available white space channels, wherein the request comprises one or more bursts of data. For example, a WSLAN gateway for a user (e.g., at a receiver location) may receive a request from a WSLAN gateway serving another user (e.g., at a transmitter location). Using the above example, method 400 at step 410 receives the second request described above.

In step 420, method 400 decodes the received request. For example, the WSLAN gateway that received the request decodes the one or more bursts of data. Using the above example, method 400 decodes the second request to retrieve the first request.

In step 425, method 400 processes the decoded request. For example, the method processes the request to identify one or more available white space channels. For example, availability of at least one white space channel is determined using a sensing method that is applied to the local location of the receiver that received the initial request.

In step 430, method 400 sends a response to the processed request. For example, the method sends a response (broadly a response pertaining to information indicative of an availability of white space channels) that comprises one or more available white space channels (or no available white space channels if that is the case). For example, the method generates a response pertaining to an availability of white space channels, encodes the response into a stream of one or more bursts of data and then transmits the resulting stream of bursts of data wirelessly back to the user who sent the initial request. The method then proceeds to step 450 to end processing the current request, or returns to step 410 to continue receiving other requests.

The WSLAN gateway serving the user who initiated the request may then aggregate the responses from the one or more other WSLAN gateways that serve the one or more other users, to identify a white space channel that is commonly available at all the locations. For example, one of the white space channels may be unused at all the locations. The WSLAN gateway may then select one of the available white space channels and establishes communication over the selected white space channel to communicate with other customers or for private use as discussed above. In this manner, the current disclosure enables the WSLAN gateways serving a plurality of users to cooperatively identify an available white space channel without causing interference to digital televisions.

It should be noted that although not specifically specified, one or more steps of method 300 or method 400 may include a storing, displaying and/or outputting step as required for a particular application. In other words, any data, records, fields, and/or intermediate results discussed in the method can be stored, displayed and/or outputted to another device as required for a particular application.

Figure 5:
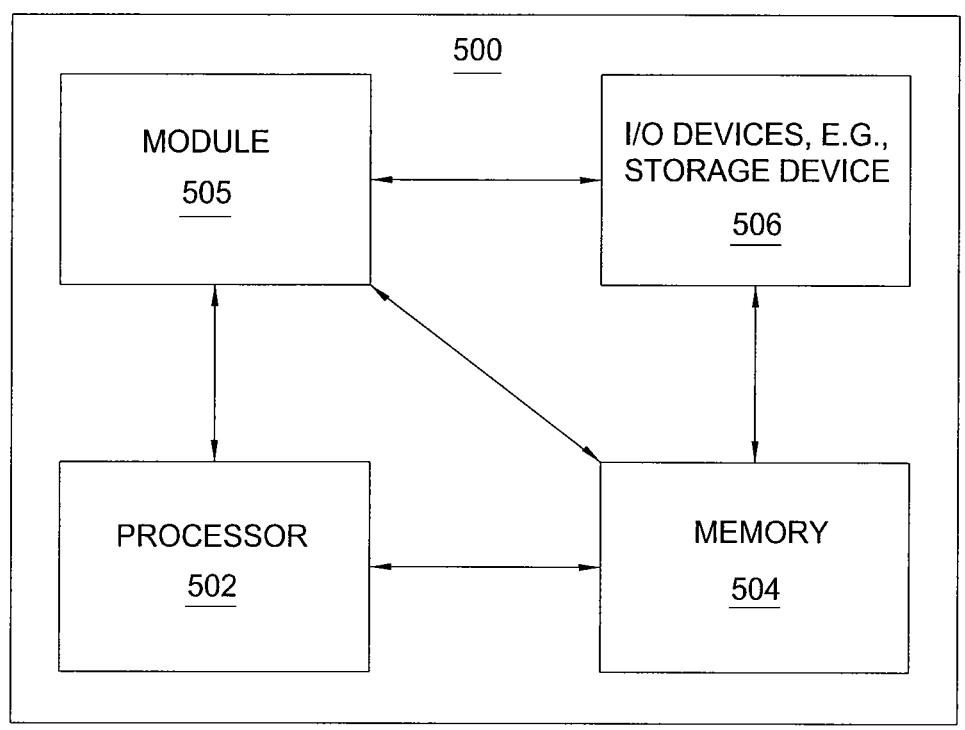
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing communication over a white space channel without causing interference to digital television systems, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for providing communication over a white space channel without causing interference to digital television systems can be loaded into memory 504 and executed by processor 502 to implement the functions as discussed above. As such, the present method 505 for providing communication over a white space channel without causing interference to digital television systems (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining an availability of a white space channel, comprising:
   generating, by a processor, a first request to identify an available white space channel;
   encoding, by the processor, the first request to create a burst of data, wherein the burst of data has a duration less than or equal to a signal duration that is based on an error tolerance standard associated with a digital television receiver, wherein the duration of the burst of data is selected based on the signal duration;
   transmitting, by the processor, the burst of data wirelessly to other devices to solicit a response as to the availability of the white space channel;
   receiving, by the processor, a response to the burst of data from one of the other devices; and
   selecting, by the processor, the white space channel in accordance with the response.

2. The method of claim 1, further comprising:
   using the white space channel that is selected for communicating with the one of the other devices.

3. The method of claim 1, further comprising:
   using the white space channel that is selected for use in a local area network.

4. The method of claim 1, wherein the processor is a processor of a gateway device.

5. The method of claim 4, wherein a decoding is performed by the gateway device in processing the response.

6. The method of claim 1, wherein the signal duration is configured by a network service provider.

7. The method of claim 1, wherein the burst of data is one of a plurality of bursts of data, wherein the bursts of data are separated from each other by a time interval.

8. The method of claim 7, wherein the time interval is selected based on the error tolerance standard for the digital television receiver.

9. The method of claim 8, wherein the time interval is selected based on an error-correcting capability of the digital television receiver.

10. The method of claim 7, wherein the time interval is configured by a network service provider.

11. A non-transitory computer-readable storage medium storing a plurality of instructions, which, when executed by a processor, cause the processor to perform operations for determining an availability of a white space channel, the operations comprising:
    generating a first request to identify an available white space channel;
    encoding the first request to create a burst of data, wherein the burst of data has a duration less than or equal to a signal duration that is based on an error tolerance standard associated with a digital television receiver, wherein the duration of the burst of data is selected based on the signal duration;
    transmitting the burst of data wirelessly to other devices to solicit a response as to the availability of the white space channel;
    receiving a response to the burst of data from one of the other devices; and
    selecting the white space channel in accordance with the response.

12. The non-transitory computer-readable storage medium of claim 11, further comprising:
    using the white space channel that is selected for communicating with the one of the other devices.

13. The non-transitory computer-readable storage medium of claim 11, further comprising:
    using the white space channel that is selected for use in a local area network.

14. The non-transitory computer-readable storage medium of claim 11, wherein the burst of data is one of a plurality of bursts of data, wherein the bursts of data are separated from each other by a time interval.

15. The non-transitory computer-readable storage medium of claim 14, wherein the time interval is selected based on the error tolerance standard for the digital television receiver.

16. A method for processing a request, comprising:
    receiving the request wirelessly by a processor, wherein the request comprises a request for an availability of a white space channel, wherein the request comprises a burst of data, wherein the burst of data has a duration less than or equal to a signal duration that is based on an error tolerance standard associated with a digital television receiver, wherein the duration of the burst of data is selected based on the signal duration;

decoding, by the processor, the request to generate a decoded request; and processing, by the processor, the decoded request to determine the availability of the white space channel;

generating, by the processor, a response to the request, wherein the response comprises information on the availability of the white space channel;

encoding the response into a burst of data; and transmitting the response wirelessly to a source of the request.

* * * * *